United States Patent [19]
Lassau et al.

[11] 3,904,692
[45] Sept. 9, 1975

[54] PROCESS FOR THE DEHYDROGENATION OF SECONDARY ALCOHOLS

[75] Inventors: Christian Lassau, Paris; Lucien Sajus, Croissy, Seine, both of France

[73] Assignee: Institut Francaise du Petrole, des Carburante et Lubrifiants, Rueil Malmaison, France

[22] Filed: Nov. 19, 1970

[21] Appl. No.: 91,190

[30] Foreign Application Priority Data
Nov. 26, 1969 France .............................. 69.40856

[52] U.S. Cl. .......... 260/586 P; 252/431 R; 260/590; 260/592; 260/596
[51] Int. Cl.² ........................................ C07C 45/16
[58] Field of Search ..... 252/431 R; 260/586 R, 590, 260/596, 592

[56] References Cited
UNITED STATES PATENTS
2,779,801  1/1957  Finch et al. ................. 260/586 R X
3,154,585  10/1964  Flanagan .................... 260/586 R X
3,355,282  11/1967  Kudo et al. ................. 260/586 R X
3,461,176  8/1969  Lundeen et al. ............... 260/596 X OTHER PUBLICATIONS
Freser et al., "Reagents for Org. Synthesis," pp. 620–625, (1967), Q 262–F5.

*Primary Examiner*—Howard T. Mars
*Assistant Examiner*—Norman Morgenstern
*Attorney, Agent, or Firm*—Millen, Raptes & White

[57] ABSTRACT

A catalyst composition for the dehydrogenation of secondary alcohols to ketones in the liquid phase is formed by contacting a a compound of a metal from groups Ib, IIb, IVa, Va, VIa, VIIa and VIII with a reducing agent of the formula $AlH_nX_{3-n}$ or $Me\,[Al\,H_mX'_{4-m}]_p$ wherein $n$ is 1 or 2, X and X' are OR, $NR_2$, NHR or SR or X' is R, R being a monovalent organic radical, a pair of X or X' groups forming optionally a divalent radical, Me is a monovalent or divalent metal from groups Ia and IIa, m is 1, 2 or 3 and $p$ is the valence of Me.

17 Claims, No Drawings

PROCESS FOR THE DEHYDROGENATION OF SECONDARY ALCOHOLS

This invention relates to a new process for the dehydrogenation of secondary alcohols to the corresponding ketones. It is known that this reaction can be carried out under heterogeneous catalysis conditions with solid catalysts based on copper, nickel or zinc oxide, in the vapor phase, or with RANEY nickel suspended in the reactants, in the liquid phase.

It has been discovered, and this is an object of this invention, that this reaction may be conducted in the liquid phase by using particularly active catalysts. These catalysts are highly soluble in the reaction mixture, so that the reaction can be considered as carried out in the homogeneous phase.

The catalyst which can be used according to this invention, is obtained by contacting a metal compound with a reducing agent.

The metal compound which is a transition metal compound, may be any salt of a metal selected from groups Ib, IIb, IVa, Va, VIa, VIIa and VIII, such as titanium, vanadium, chromium, manganese, iron, cobalt, nickel, copper, zinc, zirconium, molybdenum, ruthenium, rhodium, palladium tungsten, iridium or platinum. The associated anion or anions may be inorganic such as, for instance, a hydride, halide or sulfocyanide ion, or organic, such as, for instance, an alkoxide ion, an acetylacetonate ion, a cyclopentadienyl ion, a sulfonate ion, for example the camphosulfonate ion, or an ion of an organic acid, for example stearic acid, 2-ethyl-hexanoic acid or a naphthenic acid. The metal may be coordinated or not with electron donor ligands such as ethers, amines, phosphines, arsines or stibines.

As examples of compounds which can be used, there are to be mentioned cobalt, iron or nickel bromide, naphthenate, oleate, stearate or octoate irrespective of their actual metal content, cobalt bis-tricyclohexylphosphine dibromide, manganese stearate and chromium stearate.

The reducing agent is a boron or aluminum organic derivative, preferably an aluminum derivative, containing at least one hydrogen-boron, hydrogen-aluminum or carbon-aluminum bond.

Amongst the aluminum organic derivatives there can be used preferably those having one of the two general formulae:

1. Those of the general formula $AlH_nX_{3-n}$, wherein $n$ is 1 or 2 and the X groups, identical to or different from each other, are OR, $NR_2$, NHR or SR groups, wherein R is an organic monovalent linear or cyclic radical, either substituted or not, which may contain hetero-atoms such as oxygen, nitrogen or sulfur atoms, or even metals such as silicon or tin. R may contain, for example, from 1 to 20 carbon atoms, and may be, for example, an alkyl, cycloalkyl or aryl radical. When $n$ is 1, both X groups may be joined, so as to form a bivalent group -A-Z-B- wherein A and B are alkylene radicals having each, for example, from 1 to 8 carbon atoms, and Z is an oxygen atom, a sulfur atom, an alkylene group having from 1 to 3 carbon atoms, a NH group or a N-hydrocarbyl group, the hydrocarbyl group having preferably from 1 to 8 carbon atoms.

2. Those of the general formula $Me\,[AlH_mX'_{4-m}]_p$ wherein $m$ is 1, 2 or 3, Me is a monovalent or divalent metal selected from group Ia or IIa and $p$ is the metal valence.

The X' groups, identical to or different from each other, are R, OR, $NR_2$, NHR or SR groups, wherein R is defined as above. Two X' groups may be linked to each other as above indicated for X.

As reducing agents which can be used according to the invention, there are to be mentioned:
LiAlH(O-tert-butyl)$_3$, NaAlH(O-tert-butyl)$_3$,
NaAlH$_2$(O-cyclohexyl)$_2$, AlH(O-tert-butyl)$_2$,
NaAlH(C$_2$H$_5$)$_3$, NaAlH$_2$(OC$_6$H$_5$)$_2$, NaAlH$_2$(iso-butyl)$_2$,
NaAlH(OCH$_2$CH$_2$OCH$_3$)$_3$,

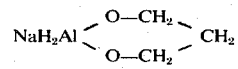

NaAlH$_2$(OCH$_2$CH$_2$OCH$_3$)$_2$, LiAlH$_2$(iso-butyl)$_2$,

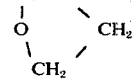

LiAlH(C$_2$H$_5$)$_3$, NaAlH(OC$_2$H$_5$)$_3$

Other reducing agents which can be used, although they have a lower activity and are less preferred, are those having the formulae:

$$Al\,R_2\,OR \text{ and } Al\,R'_3$$

wherein the R groups which are identical to or different from each other, are defined as above. The R' groups are hydrogen atoms or hydrocarbyl radicals, preferably containing each from 1 to 20 carbon atoms, at least one of them being a hydrocarbyl radical. Two R and R' groups, can be linked together as hereabove mentioned with respect to the X groups.

As examples, there will be mentioned:
Ethoxydiethylaluminum, triethylaluminum, tert-butoxydiethyl aluminum, di-n-butylaluminum hydride, di-tert-butylaluminum hydride.

Moreover, the aluminum may be replaced in any of these derivatives by another metal, particularly boron.

The action of the reducing agent on the metal compound, i.e., the preparation of the catalyst composition may be conducted in the reaction medium itself or outside therefrom. In this last embodiment the reduction reaction may be conducted at a lower temperature. Besides, it may have as an object to use reducing agents which are difficultly compatible with a use in situ, such as some metal compounds or metals which, although they are insoluble in the reaction medium, may lead to active soluble species; moreover, some organometallic reducing agents are too unstable for being used easily in situ.

The catalyst composition may be used in a solvent. It may however be advantageously used without any solvent.

According to the metal compound and the associated reducing agent, the molar ratio of the reducing agent to the metal compound may be varied. It is generally between 0.5:1 to 20:1, preferably between 1:1 and 8:1.

The reduction reaction of the metal compound is inhibited by oxygen, but it may be conducted under nitrogen, argon or methane atmosphere, preferably under a hydrogen partial pressure. It may be carried out in various solvents but the preferred solvents are the heavy paraffins, tetrahydronaphthalene and decahydronaphthalene.

The reaction is conducted at a temperature from 25° to 350°C, preferably from 150° to 300°C. The catalyst composition is advantageously manufactured at a lower temperature.

The feed is a secondary alcohol of the general formula $R_1CHOHR_2$ wherein $R_1$ and $R_2$ are separately linear monovalent organic radicals, or form together a bivalent radical, either saturated or unsaturated, branched or unbranched. Moreover, $R_1$ and $R_2$ may comprise, in addition to the carbon atoms and the hydrogen, some hetero atoms contained in an organic radical compatible with the process. Among the latter, there can be mentioned the secondary alcohol group, the ketone group, the ether group, the ester group, the secondary amine group, the primary amine group and the amide group.

The radicals $R_1$ and $R_2$ preferably contain from 1 to 20 carbon atoms each, or together from 2 to 40 carbon atoms. As examples, there can be mentioned isopropyl alcohol, secondary butyl alcohol, cyclopentanol, cyclohexanol, cyclooctanol, cyclododecanol, 2-octanol, phenyl methyl carbinol; alcohols mixtures are also convenient.

The concentration of transition metal of the catalyst may be as low as 0.001g. per 1kg. of liquid phase. The preferred concentrations are from 0.001 to 1g. of metal per 1kg. of liquid phase.

The reaction is conducted in the liquid phase, this liquid phase comprising the alcohol to be dehydrogenated with or without the reaction product. There can also be used an inert heavy solvent, and the alcohol in the vapor phase may be passed through that solvent in the liquid phase. This last embodiment can be very advantageous, since the dehydrogenation reaction is a balanced reaction and it is thus preferable to remove the reaction products in a continuous manner.

Moreover, in the case where the products and reactants may be easily removed in the vapor phase, the use of a heavy solvent will allow any part or all of the catalyst to be recycled or reused.

It is possible, if so desired, to introduce an olefin into the feed, the hydrogenation of which will allow the liberated hydrogen to be consumed, thereby giving higher conversion rates. The catalyst thus acts as an agent for transferring hydrogen from the secondary alcohol to the olefin. It is possible to operate in the presence of an inert gas such as nitrogen, argon or a light hydrocarbon such as methane. In some cases, it may be advantageous to maintain a low hydrogen partial pressure.

The following examples will illustrate this invention without however limiting the scope thereof.

EXAMPLE 1

50cc. of isopropanol at 80°C are introduced into an autoclave preliminarily made free from air. Separately, there is prepared a catalyst solution by admixing 0.2 millimole of cobalt stearate with 1.2 millimole of Na AlH(O-tert-Bu)$_3$ in 25cc. of diethyleneglycol dimethylether. The obtained dark solution is injected into the autoclave and the whole is heated up to 180°C.

After 5 hours of reaction, the gases are removed and the liquid phase is analyzed. It contains about 30% by volume of acetone, identified by its infra-red spectrum, its solid derivative with 2,4-di-nitrophenylhydrazine and its chromatographic retention time.

EXAMPLE 2

Example 1 is repeated, but in the presence of cyclohexene in the liquid phase (ratio alcohol/cyclohexene: 1/1).

After completion of the reaction, the analysis of the liquid phase shows a 50% conversion of cyclohexene to cyclohexane and a conversion to acetone close to 50%.

EXAMPLE 3

Example 1 is repeated, except that the reaction phase is pure cyclohexanol. The conversion to cyclohexanone, after 2 hours, amounts to 10%.

EXAMPLE 4

Example 1 is repeated, by using cyclododecanol instead of iso-propanol. After 5 hours of reaction, there is obtained a conversion rate of cyclododecanone close to 25%.

EXAMPLE 5

Example 1 is repeated, except that phenylmethylcarbinol is used instead of iso-propanol. After the reaction is completed, there is obtained a conversion to acetophenone close to 30%.

EXAMPLE 6

Example 1 is repeated, except that 2-butanol is used instead of iso-propanol.

After completion of the reaction, the conversion to methylethylketone is close to 25%.

EXAMPLE 7

85cc. of a mixture of decahydronaphthalene and cyclohexanol having a 13% content by volume of cyclohexanol are introduced into a steel reactor.

The reactor temperature is adjusted to 235°C and the pressure to 3 bars. There is introduced a catalyst mixture consisting of 0.17 millimole of cobalt stearate and 0.34 millimole of NaAlH (O-tert-butyl)$_3$ in 16cc. of decahydronaphthalene.

While withdrawing the vapor phase in a continuous manner, there is simultaneously introduced a mixture of cyclohexanol and decahydronaphthalene having a 30% content by volume of cyclohexanol so as to maintain a constant level of the liquid phase in the reactor. After 1 hour, there are recovered at a rate of 4.3g. per minute, 258g. of a liquid mixture having a 8% by weight cyclohexanone content, a 22.6% by weight cyclohexanol content and a 68% by weight decahydronaphthalene content.

EXAMPLE 8

5cc. of cyclopentanol and 45cc. of decahydronaphthalene are introduced into a flask which has been preliminarily made free from air. A catalyst solution is prepared by admixing 0.034 millimole of cobalt stearate and 0.127 millimole of NaAlH$_2$(O-tert-butyl) (O-tetrahydrofurfuryl) in a finely dispersed state with 3.5cc. of decahydronaphthalene. The solution is introduced into the flask and the mixture is brought up to 195°C. After 2 hours of reaction, the conversion rate of cyclopentanol to cyclopentanone amounts to 40%.

EXAMPLES 9 TO 12

Example 1 is repeated with cyclohexanol and by changing the catalyst. The results obtained are given in the following table:

| Example | Metal compound | Reducing compound | Molar ratio Al compound/metal compound | Conversion rate % |
| --- | --- | --- | --- | --- |
| 9 | nickel stearate | NaAlH(OCH$_3$)$_3$ | 4 | 20 |
| 10 | ferrous stearate | Al(iso-butyl)$_3$ | 8 | 10 |
| 11 | cobalt octoate | Al(C$_2$H$_5$)$_2$OC$_2$H$_5$ | 8 | 30 |
| 12 | cobalt octoate | NaAlH$_2$(iso-butyl)$_2$ | 6 | 30 |

What we claim as this invention is:

1. In a process for manufacturing ketones by dehydrogenating secondary alcohols, comprising contacting at least one secondary alcohol in the liquid phase with a catalytic quantity of a catalyst at a temperature between 25° and 350°C. to catalyze said dehydrogenation of said secondary alcohol to a ketone the improvement which comprises using a catalyst which is formed by admixing a hydride, halide, sulfocyanide, alkoxide, acetylacetonate, cyclopentadienyl, camphosulphonate, stearate, oleate, octoate, 2-ethyl-hexanoate or naphthenic acid compound of a metal selected from the group consisting of titanium, vanadium, chromium, manganese, iron, cobalt, nickel, copper, zinc, zirconium, molybdenum, ruthenium, rhodium, palladium, tungsten, iridium and platinum with a reducing agent selected from the group consisting of compounds of the formula AlH$_n$X$_{3-n}$ wherein $n$ is 1 or 2, X is the same or different and is OR, NR$_2$, NHR or SR wherein R is alkyl, cycloalkyl or aryl of 1 to 20 carbon atoms and when $n$ is 1 both X groups may be joined to form a bivalent group -A-Z-B- wherein A and B are alkylene radicals having 1 to 8 carbon atoms and Z is oxygen, sulfur, alkylene of 1 to 3 carbon atoms, NH or N-Hydrocarbyl wherein the hydrocarbyl group has 1 to 8 carbon atoms; compounds of the formula Me[AlH$_m$X'$_{4-m}$]$_p$ wherein $m$ is 1, 2 or 3, Me is a monovalent or divalent group I$a$ or II$a$ metal, X' is the same as X defined above and R is as defined above; compounds of the formula AlR$_2$OR and AlR'$_3$ wherein R is as defined above, R' is hydrogen or hydrocarbyl or 1 to 20 carbon atoms, at least one of them being hydrocarbyl and two R or R' groups can be linked together to form a bivalent group as defined for X above and the corresponding compounds wherein boron replaces aluminum in each of the formulae above and the molar ratio of said organic reducing compound to said compound of a metal is 0.5:1 to 20:1, respectively.

2. A process according to claim 1, wherein the reducing agent has the formula Al H$_n$ X$_{3-n}$.

3. A process according to claim 1, wherein the reducing agent has the formula Me [ AlH$_m$X'$_{4-m}$ ]$_p$.

4. A process according to claim 1, wherein the reducing agent has the formula Al R$_2$ OR.

5. A process according to claim 1, wherein the reducing agent has the formula Al R'$_3$.

6. A process according to claim 1, wherein the molar ratio between the reducing agent and the metal compound is between 1:1 and 8:1 respectively.

7. A process according to claim 1, wherein the secondary alcohol is iso-propanol.

8. A process according to claim 1, wherein the secondary alcohol is selected from the group consisting of cyclohexanol, cyclopentanol and cyclododecanol.

9. A process according to claim 1, wherein the secondary alcohol is phenylmethylcarbinol.

10. A process according to claim 1, wherein the secondary alcohol is secondary butanol.

11. A process according to claim 1, wherein the metal compound is a compound selected from the group consisting of the iron, cobalt and nickel compounds.

12. A process according to claim 1, wherein the metal compound is used in an amount of 1 to 1000 parts, expressed as metal, per million of parts by weight of the liquid phase.

13. A process according to claim 1, conducted at a temperature between 150° and 300°C.

14. A process according to claim 6, wherein the metal compound is used in an amount of 1 to 1,000 parts, expressed as metal, per million of parts by weight of the liquid phase.

15. A process as defined by claim 1, wherein the liquid phase contains an olefin capable of being hydrogenated by the hydrogen liberated during the dehydrogenation reaction, whereby higher conversion rates from the secondary alcohol to the ketone are achieved.

16. A process according to claim 1, wherein the metal is iron, cobalt, nickel, manganese or chromium.

17. A process according to claim 1 wherein the transition metal compound is a stearate or octoate of nickel, iron or cobalt.

* * * * *